US006947992B1

(12) United States Patent
Shachor

(10) Patent No.: US 6,947,992 B1
(45) Date of Patent: Sep. 20, 2005

(54) MAINTAINING HTTP SESSION AFFINITY IN A CLUSTER ENVIRONMENT

(75) Inventor: Gal Shachor, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,375

(22) Filed: May 1, 2000

(51) Int. Cl.⁷ ............................................. G06F 15/16
(52) U.S. Cl. ...................... 709/228; 709/227
(58) Field of Search .................. 709/201, 203, 709/227, 219, 229, 228; 380/30; 713/201

(56) References Cited

U.S. PATENT DOCUMENTS

| | | | | |
|---|---|---|---|---|
| 5,774,660 | A * | 6/1998 | Brendel et al. | 709/201 |
| 6,094,485 | A * | 7/2000 | Weinstein et al. | 380/30 |
| 6,098,093 | A * | 8/2000 | Bayeh et al. | 709/203 |
| 6,374,300 | B2 * | 4/2002 | Masters | 709/229 |
| 6,466,949 | B2 * | 10/2002 | Yang et al. | 707/201 |
| 6,473,802 | B2 * | 10/2002 | Masters | 709/229 |
| 6,480,894 | B1 * | 11/2002 | Courts et al. | 709/227 |
| 6,567,848 | B1 * | 5/2003 | Kusuda et al. | 709/219 |
| 6,715,082 | B1 * | 3/2004 | Chang et al. | 713/201 |

OTHER PUBLICATIONS

"What Is . . . HTTP (a Definition)",(http://www.whatis.com/http.htm).
"What Is . . . the OSI Session Layer (A Definition)", (http://www.whatis.com/seslayer.htm).
"What Is . . . Open Systems Interconnection (OS)—An Illustration" (http://www.whatis.com/osifig.htm).
"About Domino" (http://www.lotus.com/products).

* cited by examiner

Primary Examiner—Ayaz Sheikh
Assistant Examiner—Christian La Forgia
(74) Attorney, Agent, or Firm—Darby & Darby

(57) ABSTRACT

A method for controlling communications between a client and a cluster of servers includes conducting a first communication session over a network between the client and a selected one of the servers in the cluster, and sending identifying data generated responsive to the first communication session over the network for storage by the client. Upon receiving a request from the client to conduct a second communication session, the request comprising the identifying data, the request is routed to the selected server responsive to the identifying data in the request.

24 Claims, 4 Drawing Sheets

MAINTAINING HTTP SESSION AFFINITY IN A CLUSTER ENVIRONMENT

FIELD OF THE INVENTION

The present invention relates generally to client/server network applications, and specifically to World Wide Web sites that use clusters of servers to handle large volumes of client traffic.

BACKGROUND OF THE INVENTION

Popular Web sites, such as large electronic commerce (e-commerce) sites, must frequently handle large numbers of clients accessing the site simultaneously. In order to serve all of the clients promptly, such a site typically uses a cluster of Web server hosts operating in parallel. Client requests to access the site via the Web, typically in the form of hypertext transfer protocol (HTTP) requests, are distributed among the hosts by a router. Routers for this purpose, such as the "eND" server produced by IBM Corporation, are known as "spray routers," because they "spray" the incoming requests among the hosts in the cluster in order to balance the processing load among them. Each of the Web server hosts comprises a suitable computer running both a Web server process or engine, along with whatever other application engines or processes are needed to serve client requests.

Simple spray routing of client requests is possible because HTTP itself is stateless, i.e., each communication session is independent of any previous session. Therefore, after a session between a client and any one of the Web servers terminates, the next session can be set up and handled just as well by any other one of the servers. To the extent that it is desirable to remember state information from one session to the next, the Web server passes the information to be stored by a "session holder"—typically another computer in the cluster that serves as a state repository. The Web server makes the client store an identifier, generally in the form of a "cookie" on the client's disk. The next time the client submits a HTTP request to the Web site, the client identifier is read back from the client's disk. Typically, the site's Web pages are coded so that data from the stored client identifier are inserted into an appropriate field in the HTTP request headers. Alternatively, the data may be conveyed using other methods known in the art, such as in a URL rewrite mechanism, for example.

Whichever one of the Web servers receives the request from the spray router uses the client identifier to fetch the necessary state information from the session holder. Retrieving the state information is time-consuming and slows the performance of the Web server and of the cluster as a whole. Since it is not possible to predict which Web server will receive any given client request from the router, however, the servers cannot cache the appropriate state data and must retrieve it from the session holder every time there is a new HTTP request.

In some large Web sites, the router maintains a fixed look-up table of Internet Protocol (IP) addresses and assigns each client to a server based on the client's IP address. All clients with IP addresses in a given range are assigned to the same server. Thus, as long as a client's IP address has not changed from one HTTP session to the next, the client's HTTP requests will be assigned repeatedly to the same server. This approach does not address the problem of multiple application engines running on the same server. Furthermore, when one of the Web servers goes down, clients assigned to that server will receive no service at all.

SUMMARY OF THE INVENTION

It is an object of some aspects of the present invention to provide a Web site architecture based on a cluster of Web servers that enables the site to serve clients with improved speed and efficiency.

It is a further object of some aspects of the present invention to provide a method for maintaining affinity between a client accessing a Web site in a HTTP session and one of a cluster of Web servers on the site.

It is yet a further object of some aspects of the present invention to provide a method for maintaining affinity between a client accessing a Web site in a HTTP session and an application running on one of a cluster of Web servers on the site.

In preferred embodiments of the present invention, a Web site comprises a plurality of Web server hosts, with a router to distribute client HTTP requests among the servers and a session holder to store session data. Each host runs a Web server process and, optionally, one or more other application processes, as well. When a client accesses the Web site and conducts a HTTP session with one of the servers, the server downloads to the client a session identifier (session ID). The session ID comprises data identifying the Web server host, the process on the host that is responsible for the session, and a version-validity counter value. The session ID is preferably stored by the client in the form of a cookie.

The Web site pages are coded so that when the client subsequently accesses the Web site again, the session ID is included in the client's HTTP request. The router reads the session ID in order to route the client's HTTP request to the same host as previously. The host then reads the ID in order to pass the request to the appropriate process and to check the version-validity counter value. If the counter value matches a value stored by the server in a cache of session data maintained by the server for this client, the server can conclude that a cache hit has occurred. In this case, the server can simply use the cached session data, and need not retrieve any data from the session holder. If there is no session data in the cache for this client, or if there is a mismatch in the version-validity counter value, however, the server reloads the cache with data from the session holder. When there is a change in session data during the session, the server saves the new data in the session holder, increments the version-validity counter, and downloads a modified session ID with the new counter value, to be stored by the client for the next session.

Thus, affinity is maintained between the client and one of the Web servers at the application level, from one HTTP session to the next. In successive HTTP sessions initiated by the client, the probability of a cache hit at the server is maximized, while the need to retrieve state data from the session holder is reduced. As a result, the efficiency and speed of the server cluster are enhanced. There is no need for the router to maintain a fixed affinity table, unlike systems known in the art based on IP address affinity. The present invention thus offers a solution that is easily scalable, flexible and adaptive in the face of changes or faults occurring in the cluster.

Although preferred embodiments described herein use a router to read the client's session ID information and to route the client's HTTP request accordingly, the methods of the present invention may be used to process the request and maintain session affinity even in the absence of a router. In this case, the Web server reads the session ID information and uses it to assign the session to the appropriate application process and to validate the cache data. Furthermore although these preferred embodiments deal with HTTP sessions running on Web servers, the principles of the present invention are similarly applicable to other cluster-based client/server application layer protocols. The protocol must be such as to allow the server to send a session ID to the client and to allow the client to return the session ID to the server at the beginning of a message.

There is therefore provided, in accordance with a preferred embodiment of the present invention, a method for controlling communications between a client and a cluster of servers, including:

conducting a first communication session over a network between the client and a selected one of the servers in the cluster;

sending identifying data generated responsive to the first communication session over the network for storage by the client;

receiving a request from the client to conduct a second communication session, the request including the identifying data; and routing the request to the selected server responsive to the identifying data in the request.

Preferably, conducting the first communication session includes communicating using an application protocol, most preferably the Hypertext Transfer Protocol (HTTP), and wherein receiving the request includes receiving a HTTP request. Further preferably, the network includes the Internet, and wherein the servers include Web servers.

Preferably, the identifying data include a reference to a network address of the selected server, wherein the network address includes a Transmission Control Protocol/Internet Protocol (TCP/IP) address. Further preferably, the identifying data include an identification of a routing port associated with the selected server.

Additionally or alternatively, conducting the first communication session includes running an application process on the selected server, and the identifying data include an identification of the application process. Preferably, routing the request includes passing the request to be handled by the application process.

Further additionally or alternatively, sending the identifying data includes updating a value of a version-validity counter so as to identify a current version of session data in a cache held by the selected server, and sending the updated value of the counter to the client. Preferably, the method includes receiving the routed request at the server and comparing a first value of the version-validity counter included in the request from the client to a second value of the version-validity counter held by the server so as to determine whether to use the session data in the cache in the second communication session. Most preferably, the method includes storing the session data from the first communication session in a session holder and retrieving the stored session data from the session holder for use in the second communication session responsive to a mismatch between the first and second values of the version-validity counter. Additionally or alternatively, updating the value of the version-validity counter includes updating the value responsive to a change of a predetermined type in the session data.

Preferably, sending the identifying data includes sending a cookie to be stored by the client. Alternatively or additionally, receiving the request from the client includes receiving a Uniform Resource Locator (URL) that has been rewritten by a server to include the identifying data.

There is also provided, in accordance with a preferred embodiment of the present invention, a method for controlling communications between a client and one or more servers, including:

conducting a first communication session over a network between the client and a selected process running on one of the servers;

sending identifying data generated responsive to the first communication session over the network for storage by the client;

receiving a request from the client to conduct a second communication session, the request including the identifying data; and passing the request to be handled by the selected process responsive to the identifying data in the request.

Preferably, sending the identifying data includes updating a value of a version-validity counter so as to identify a current version of session data in a cache used by the selected process, and sending the updated value of the counter to the client. Further preferably, the method includes comparing a first value of the version-validity counter included in the request from the client to a second value of the version-validity counter held by the server so as to determine whether to use the session data in the cache in the second communication session. Most preferably, the method includes reloading the cache responsive to a mismatch between the first and second values of the version-validity counter. Additionally or alternatively, updating the value of the version-validity counter includes updating the value responsive to a change of a predetermined type in the session data.

Preferably, the process includes an application process using the Hypertext Transfer Protocol (HTTP).

There is additionally provided, in accordance with a preferred embodiment of the present invention, network server apparatus, including:

a cluster of servers, coupled to communicate with a client over a network, and operative, responsive to a first communication session conducted between the client and a selected one of the servers in the cluster, to send identifying data generated responsive to the first communication session over the network for storage by the client; and a router, coupled to receive a request from the client to conduct a second communication session, the request including the identifying data, and to route the request to the selected server responsive to the identifying data in the request.

Preferably, the servers include application servers, which communicate with the client using an application protocol. Most preferably, the application protocol includes the Hypertext Transfer Protocol (HTTP), and wherein the request includes a HTTP request.

Further preferably, the router includes a plurality of ports, and the identifying data include an identification of one of the ports that is linked to the selected server.

There is further provided, in accordance with a preferred embodiment of the present invention, network server apparatus, which is coupled to conduct a first communication session over a network between a client and a selected process running on the server and to send identifying data generated responsive to the first communication session over the network for storage by the client, such that in response to a request from the client to conduct a second communication session, the request including the identifying data, the server passes the request to the selected process for handling responsive to the identifying data in the request.

There is moreover provided, in accordance with a preferred embodiment of the present invention, a computer software product for controlling communications between a client and a cluster of servers, the product including a computer-readable medium in which program instructions are stored, which instructions, when read by a selected one of the servers, cause the server to conduct a first communication session over a network with the client and to send identifying data generated responsive to the first communication session over the network for storage by the client, so that when a request including the identifying data is received at the cluster from the client to conduct a second communication session, the request is routed to the selected server responsive to the identifying data in the request.

There is additionally provided, in accordance with a preferred embodiment of the present invention, a computer software product for controlling communications between a client and a cluster of servers, wherein in response to a first communication session over a network between the client and a selected one of the servers in the cluster, the selected server sends identifying data generated responsive to the first communication session over the network for storage by the client, the product including a computer-readable medium in which program instructions are stored, which instructions, when read by a router coupled to the cluster of servers, causes the router, upon receiving a request from the client over the network to conduct a second communication session, the request including the identifying data, to route the request to the selected server responsive to the identifying data in the request.

There is furthermore provided, in accordance with a preferred embodiment of the present invention, a computer software product for controlling communications between a client and a server, the product including a computer-readable medium in which program instructions are stored, which instructions, when read by the server, cause the server to conduct a first communication session over a network between the client and a selected process running on the server, and to send identifying data generated responsive to the first communication session over the network for storage by the client, wherein in response to receiving a request from the client to conduct a second communication session, the request including the identifying data, the instructions cause the server to pass the request to be handled by the selected process responsive to the identifying data in the request.

The present invention will be more fully understood from the following detailed description of the preferred embodiments thereof, taken together with the drawings in which:

DETAILED DESCRIPTION OF PREFERRED EMBODIMENTS

Figure 1:
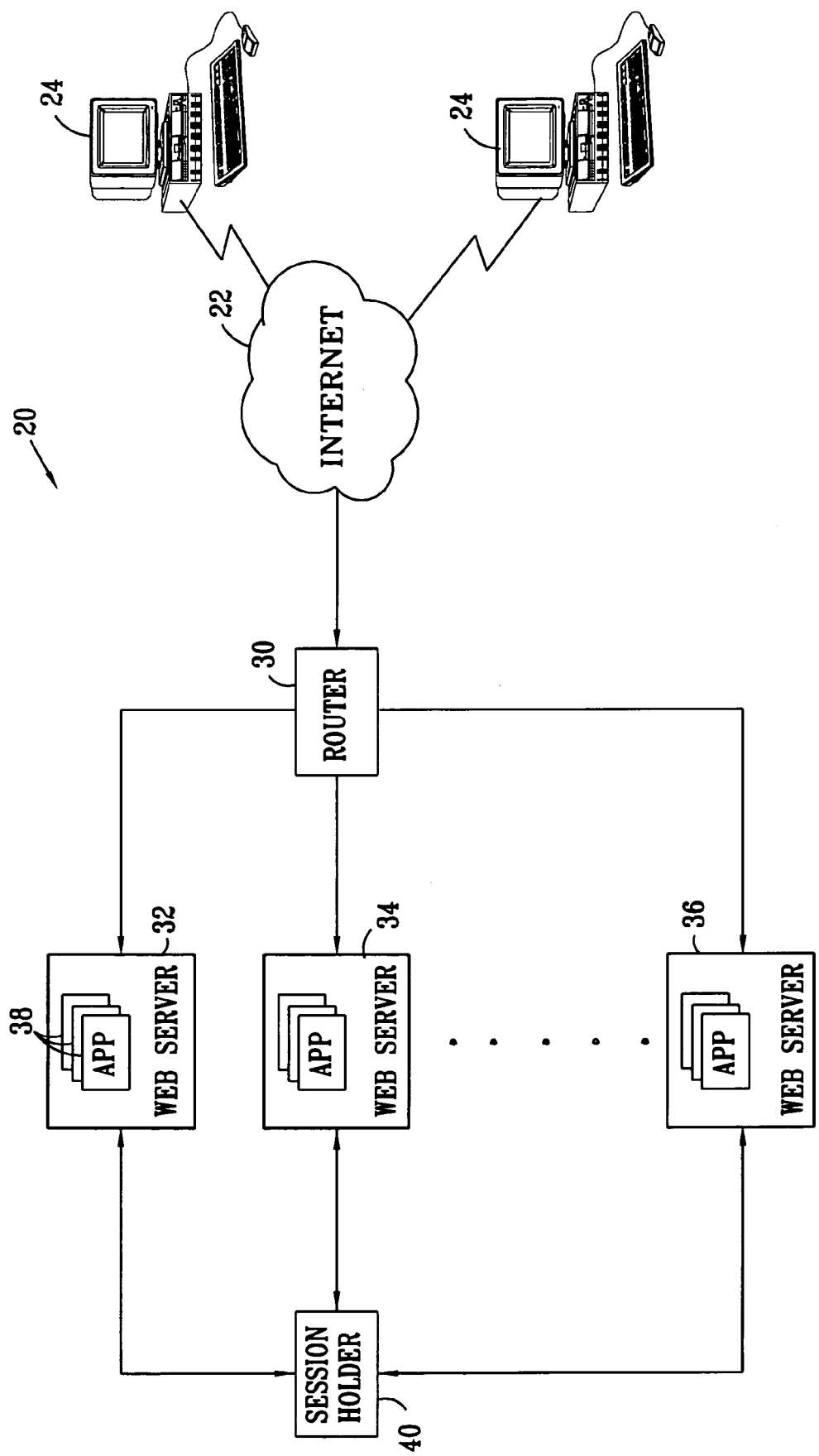
FIG. 1 is a block diagram that schematically illustrates a Web site serving a client via the Internet, in accordance with a preferred embodiment of the present invention.

FIG. 1 is a block diagram that schematically illustrates a Word Wide Web site 20, in accordance with a preferred embodiment of the present invention. The Web site is coupled to communicate via a network 22, preferably the Internet, with clients 24. These clients typically comprises personal computers running suitable browser software. The clients communicate with the Web site using the Hypertext Transfer Protocol (HTTP) over the lower-level Transmission Control Protocol and Internet Protocol (TCP/IP). Alternatively, Web site 20 and clients 24 may communicate over networks of other types, and may use other communication and application-layer protocols.

Web site 20 comprises a router 30, which receives HTTP requests from client 24 and distributes them among a plurality of Web servers 32, 34, . . . , 36. The router preferably comprises a spray router, such as the above-mentioned IBM eND server, with suitable modification as described hereinbelow. The Web servers comprise host computers, of substantially any suitable type known in the art, running Web server software. In addition to the necessary Web server software process, each of the servers typically runs one or more application servers 38 or application engines, such as a Java Virtual Machine (JVM). State data regarding HTTP sessions conducted by the Web servers are stored by a session holder 40, which similarly comprises a host computers with suitable software. Alternatively, the session holder may reside on the same host as one of the Web servers. The software required for the operation of router 30, Web servers 32, 34, 36 and session holder 40 may be downloaded to the respective computers over a network. Alternatively, the software may be supplied on tangible media, such as CD-ROM or non-volatile memory, for installation in the computers.

Figure 2:
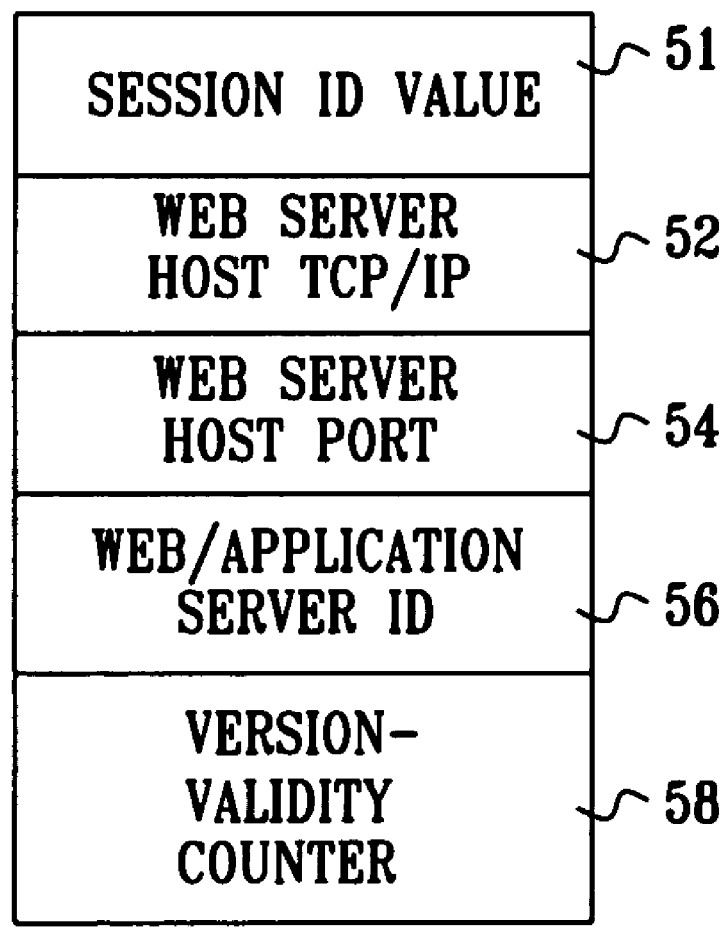
FIG. 2 is a block diagram that schematically illustrates a data structure that serves as a session identifier, in accordance with a preferred embodiment of the present invention.

FIG. 2 is a block diagram that schematically illustrates a data structure serving as a session ID 50, in accordance with a preferred embodiment of the present invention. When client 24 conducts an initial HTTP session with site 20, the Web server assigned to the client, say server 32, downloads the session ID to the client, during and/or at the conclusion of the HTTP session. The session ID is preferably downloaded to client 24 in the form of a cookie, and is then stored on the client's hard disk, as is known in the art. ID 50 preferably includes a unique session ID value 51, as well as a TCP/IP address field 52 and a port field 54, respectively identifying the TCP/IP address and router port of the Web server host. Alternatively, instead of the address and port in fields 52 and 54, the ID may include a key to a lookup table that is used by router 30 to identify the server hosts. The ID also includes a process identifier field 56, which identifies the Web server or other application server process 38 that is responsible for the most recent session, and a version-validity counter field 58, whose function is described hereinbelow.

In subsequent HTTP sessions, the client conveys stored session ID 50 to the Web site as part of its HTTP request to initiate the new session. Preferably, the session ID is conveyed from the client to the Web site in the HTTP request header, in substantially the same manner as cookie data stored by a client are conventionally conveyed to a server in a HTTP request. Alternatively, a URL-rewrite mechanism may be used to convey the session ID to router 30. In this case, Web pages on site 20 are coded, typically using hypertext mark-up language (HTML) code, so that when client 24 requests a new page, the universal resource locator (URL) of the new page is rewritten by the client browser to include the session ID data. Although methods such as these are commonly used in Web programming, their application for conveying session data and maintaining session affinity at the HTTP level between client 24 and server 32, as described hereinbelow, is not known in the art.

Figure 3:
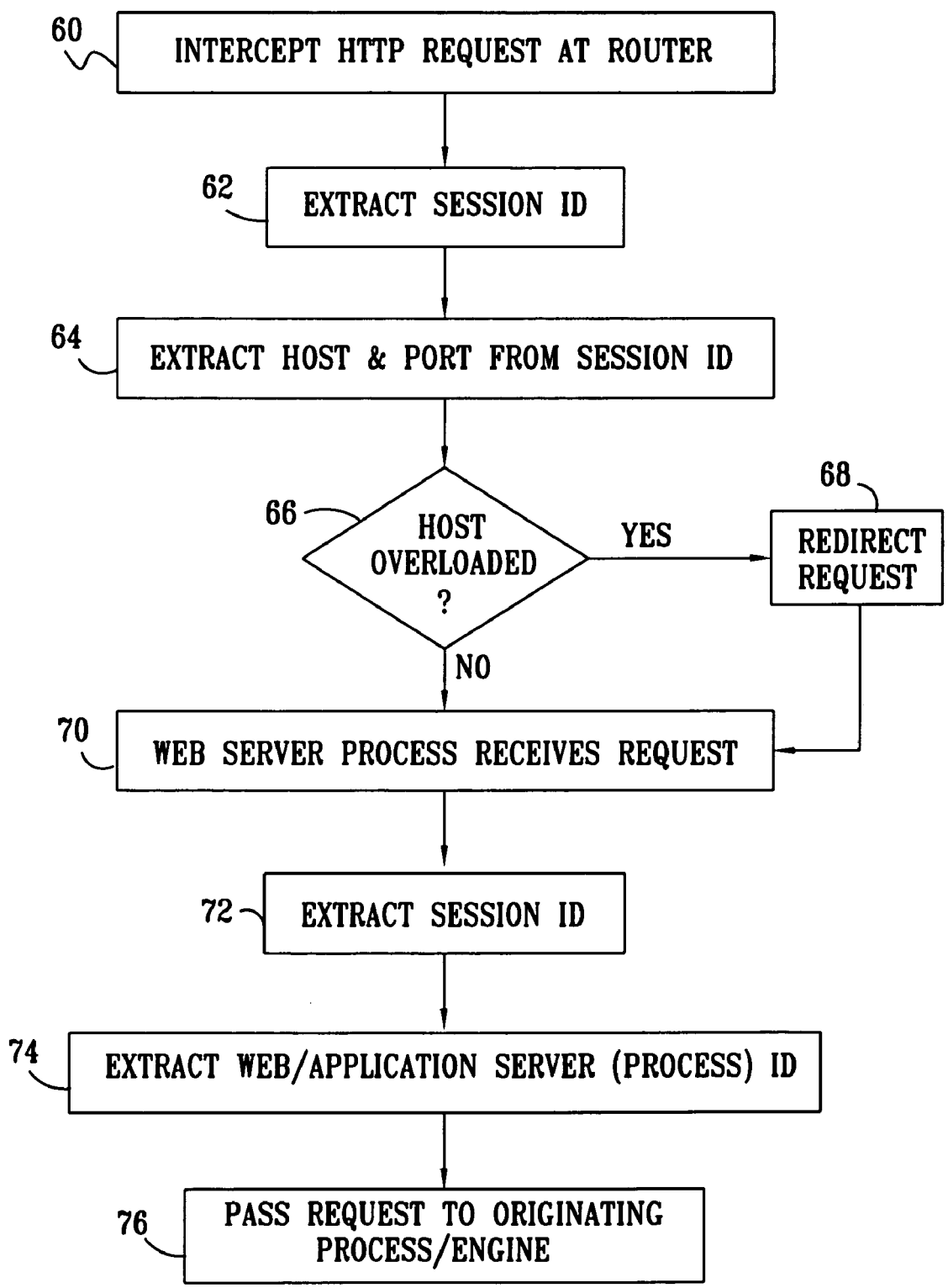
FIG. 3 is a flow chart that schematically illustrates a method for routing HTTP requests, in accordance with a preferred embodiment of the present invention.

FIG. 3 is a flow chart that schematically illustrates a method for routing a HTTP request received at site 20 from client 24, in accordance with a preferred embodiment of the present invention. At a HTTP interception step 60, router 30 intercepts the incoming HTTP request and, at a first ID extraction step 62, extracts the session ID from the request. The router uses the information in fields 52 and 54 of session ID 50 (FIG. 2), in a host and port extraction step 64, to determine the address and router port of the Web server host to which the request should be routed. This will generally be the same host, say server 32, that served client 24 in the client's previous HTTP session. Alternatively, under some circumstances it may be expeditious to determine in advance in one session that the user's next HTTP request will be directed to a different server. In such a case, fields 52 and 54 will identify that different server.

At an overload checking step 66, the router determines whether the host to whom the request is directed is capable of handling the request. If the host is overloaded with other client requests or is unavailable for some other reason, due to a system failure, for example, the current client request is redirected to another host, at a redirection step 68. Otherwise, the request is routed in accordance with the information in the session ID.

Whichever host is selected by the router, a Web server process running on the selected host receives the HTTP request from router 30 at a request reception step 70. The server extracts session ID 50 from the request, at a second ID extraction step 72. It then extracts the server ID written in field 56 of the session ID, at a server ID extraction step 74. Typically, as noted above, the server ID identifies an application process or application engine, such as process 38, that handled the client's preceding HTTP session and from which the data in field 56 originated. Alternatively, for some servers, such as the Domino integrated messaging and Web application software platform, the originating process may be the Web server process itself. ("Domino" is a trademark of the Lotus Development Corporation.) Based on the server ID, the client request is passed to the originating process or engine for handling, at a request passing step 76.

Figure 4:
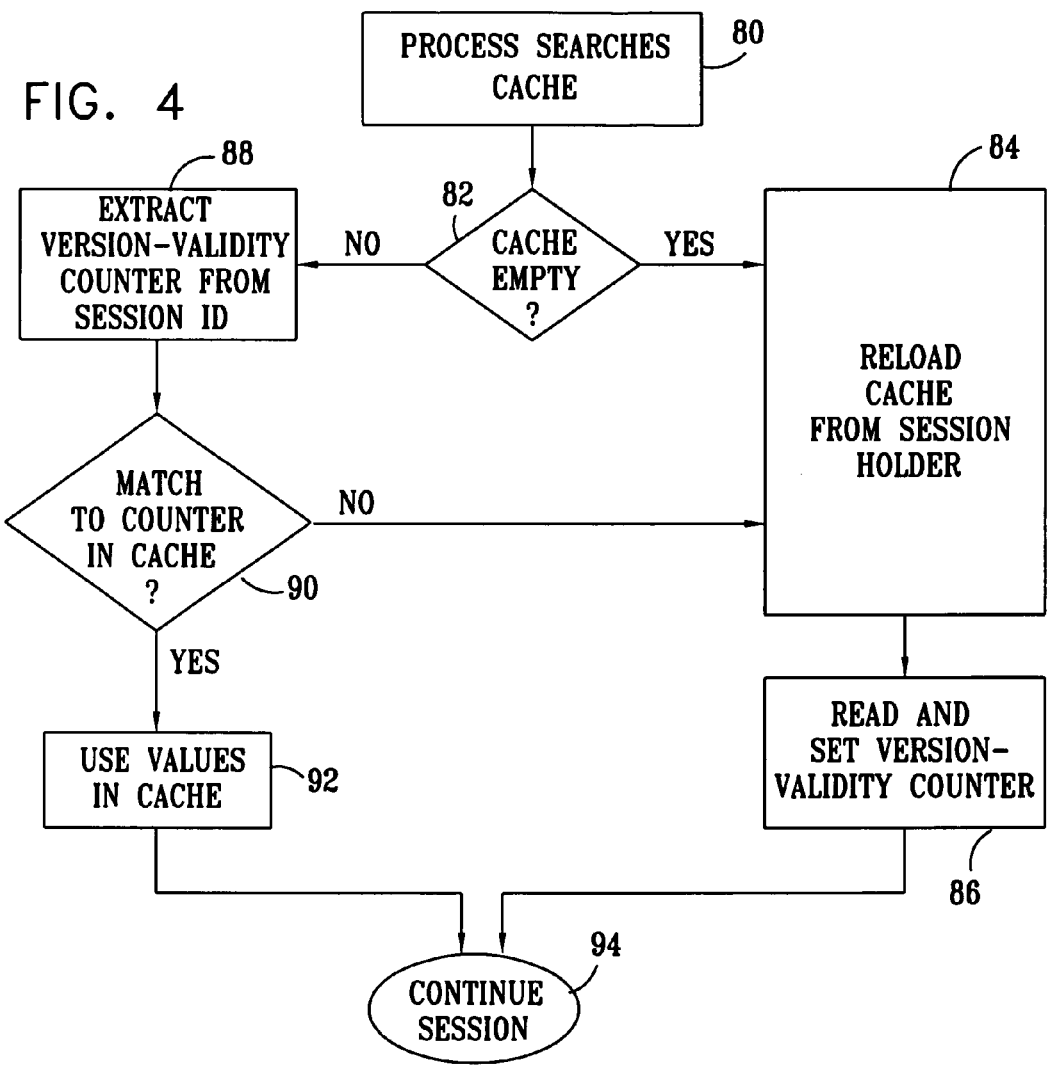
FIG. 4 is a flow chart that schematically illustrates a method for processing a HTTP request, in accordance with a preferred embodiment of the present invention.

FIG. 4 is a flow chart that schematically illustrates a method for processing of the data in session ID 50, in accordance with a preferred embodiment of the present invention. This method is typically carried out by the server process (or engine) on server host 32 that receives the client's HTTP request at step 76. At a cache search step 80, the server's memory cache is searched for session data belonging to this client, based on session ID value 51. At a cache check step 82, the process determines whether there is any suitable data in the cache. If not, then at a cache reload step 84, the cache is reloaded with data fetched from by session holder 40. The process also reads the value of the version-validity counter for the session data loaded from the session holder, at a counter setting step 86, and sets the counter in the cache to this value. The HTTP session can then proceed, at a session continuation step 94.

On the other hand, if the process finds at step 82 that there is relevant session data in the cache, it verifies the data by extracting the value of the version-validity counter that is currently held by the cache, at a count extraction step 88. This value is compared to the counter value in field 58 of session ID 50, at a counter matching step 90. If there is a mismatch of the counter values, the process concludes that the cache data are invalid, and the cache is reloaded with data from the session holder at step 84. If the values match, however, the process can go on using the session data in the cache, at a cache hit step 92, and the session continues.

Figure 5:
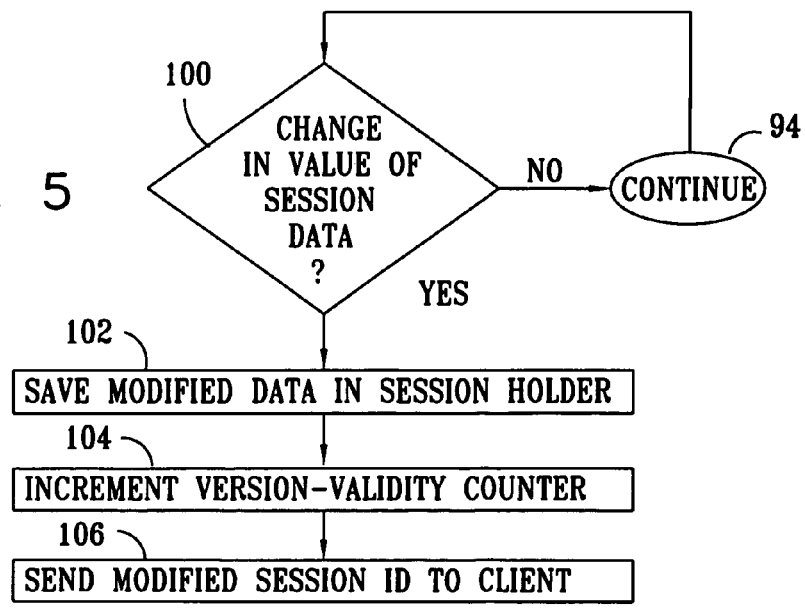
FIG. 5 is a flow chart that schematically illustrates a method for storing session data, in accordance with a preferred embodiment of the present invention.

FIG. 5 is a flow chart that schematically illustrates a method for handling and storing changes in session data during a HTTP session between client 24 and server 32, in accordance with a preferred embodiment of the present invention. During the session, the server process checks for changes in the session data, at a session data change step 100. Preferably, the process checks the values of selected fields of the session data, or of all such fields, in order to detect any relevant changes that have occurred. Alternatively, an application program interface (API) is provided, enabling an application programmer to specify changes that are to be detected. In either case, the detected changes may include all changes occurring in the session data, or they may include only a selected subset. Limiting the detected changes to a selected subset may mean that there will be some inaccuracies in the session data passed to the session holder, as described below, but the application will probably run more quickly as a consequence. The programmer is thus given the option of trading off absolute session data accuracy for application performance.

When a relevant change is detected at step 100, server 32 sends the modified session data to session holder 40, at a data saving step 102. This step may take place during the session or upon its conclusion. At the same time, at a counter incrementing step 104, the server updates the version-validity counter. The updated counter value is recorded in the server cache and in the session data saved by the session holder. The server modifies session ID 50 to include the new counter value in field 58, as well as any other changes that may have occurred in the other data fields, and sends the modified ID to be stored by client 24 at an ID sending step 106. The client will use the modified session ID in its next HTTP request.

Although the preferred embodiment shown in FIG. 1 uses router 30 to route the client HTTP requests based on the session ID, the methods of FIGS. 4 and 5 may also be used by Web servers independently of any router. In such a case, a Web server receiving a client HTTP request reads the session ID information and uses it to assign the session to the appropriate application process or engine and to validate the data in its cache. If necessary, the Web server receiving the request many redirect the request to an appropriate server process on a different host. If the cache data are invalid, the cache is reloaded from disk, for example.

Furthermore although the preferred embodiments described herein deal with HTTP sessions running on Web servers, the principles of the present invention are similarly applicable to other cluster-based client/server applications. For example, the principles of the present invention may be applied, mutatis mutandis, in multimedia applications that run over the User Datagram Protocol (UDP).

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for controlling communications between a client and a cluster of servers, comprising:
   conducting a first communication session over a network between the client and a selected one of the servers in the cluster;
   updating a value of a version-validity counter so as to identify a current version of session data in a cache held by the selected one of the servers;
   sending identifying data generated responsive to the first communication session together with the updated value of the counter over the network for storage by the client;
   receiving a request from the client to conduct a second communication session, the request comprising the identifying data; and
   routing the request to the selected server responsive to the identifying data in the request; and
   receiving the routed request at the server and comparing a first value of the version-validity counter comprised in the request from the client to a second value of the version-validity counter held by the server so as to determine whether to use the session data in the cache in the second communication session.

2. A method according to claim 1, wherein conducting the first communication session comprises communicating using an application protocol.

3. A method according to claim 2, wherein the application protocol comprises the Hypertext Transfer Protocol (HTTP), and wherein receiving the request comprises receiving a HTTP request.

4. A method according to claim 3, wherein the network comprises the Internet, and wherein the servers comprise Web servers.

5. A method according to claim 1, wherein the identifying data comprise a reference to a network address of the selected server.

6. A method according to claim 5, wherein the network address comprises an Internet Protocol (IP) address.

7. A method according to claim 1, wherein the identifying data comprise an identification of a routing port associated with the selected server.

8. A method according to claim 1, wherein conducting the first communication session comprises running an application process on the selected server, and wherein the identifying data comprise an identification of the application process.

9. A method according to claim 8, wherein routing the request comprises passing the request to be handled by the application process.

10. A method according to claim 1, and comprising storing the session data from the first communication session in a session holder and retrieving the stored session data from the session holder for use in the second communication session responsive to a mismatch between the first and second values of the version-validity counter.

11. A method according to claim 1, wherein updating the value of the version-validity counter comprises updating the value responsive to a change of a predetermined type in the session data.

12. A method according to claim 1, wherein sending the identifying data comprises sending a cookie to be stored by the client.

13. A method according to claim 1, wherein receiving the request from the client comprises receiving a Uniform Resource Locator (URL) that has been rewritten by a server to include the identifying data.

14. Network server apparatus, comprising:
   a cluster of servers, coupled to communicate with a client over a network, and operative, responsive to a first communication session conducted between the client and a selected one of the servers in the cluster, to send identifying data generated responsive to the first communication session over the network for storage by the client,
   wherein the selected one of the servers comprises a cache, and wherein the identifying data sent to the client comprise a value of a version-validity counter, which is updated by the selected one of the servers so as to identify a current version of session data in the cache; and
   a router, coupled to receive a request from the client to conduct a second communication session, the request comprising the identifying data, and to route the request to the selected server responsive to the identifying data in the request,
   wherein the selected server compares a first value of the version-validity counter comprised in the request from the client to a second value of the version-validity counter held by the server so as to determine whether to use the session data in the cache in the second communication session.

15. Apparatus according to claim 14, wherein the servers comprise application servers, which communicate with the client using an application protocol.

16. Apparatus according to claim 15, wherein the application protocol comprises the Hypertext Transfer Protocol (HTTP), and wherein the request comprises a HTTP request.

17. Apparatus according to claim 16, wherein the network comprises the Internet, and wherein the servers comprise Web servers.

18. Apparatus according to claim 14, wherein the identifying data comprise a reference to a network address of the selected server.

19. Apparatus according to claim 18, wherein the network address comprises an Internet Protocol (IP) address.

20. Apparatus according to claim 14, wherein the router comprises a plurality of ports, and wherein the identifying data comprise an identification of one of the ports that is linked to the selected server.

21. Apparatus according to claim 14, wherein the first communication session is conducted by an application process running on the selected server, and wherein the identifying data comprise an identification of the application process, responsive to which the selected server passes the request to be handled by the application process.

22. Apparatus according to claim 14, and comprising a session holder, which is coupled to receive and store the session data from the first communication session, wherein the servers are adapted to retrieve the stored session data from the session holder for use in the second communication session responsive to a mismatch between the first and second values of the version-validity counter.

23. A computer software product for controlling communications between a client and a cluster of servers, the product comprising a computer-readable medium in which program instructions are stored, which instructions, when read by a selected one of the servers, cause the server to conduct a first communication session over a network with the client and to update a value of a version-validity counter so as to identify a current version of session data in a cache held by the server, and to send identifying data generated responsive to the first communication session together with the updated value of the counter over the network for storage by the client, so that when a request comprising the identifying data is received at the cluster from the client to conduct a second communication session, the request is routed to the selected server responsive to the identifying data in the request, and the server, upon receiving the routed request, compares a first value of the version-validity counter comprised in the request from the client to a second value of the version-validity counter held by the server so as to determine whether to use the session data in the cache in the second communication session.

24. A product according to claim 23, wherein the servers comprise Web servers, which communicate with the client using the Hypertext Transfer Protocol (HTTP), and wherein the request comprises a HTTP request.

* * * * *